Patented Aug. 14, 1945

2,381,970

UNITED STATES PATENT OFFICE 2,381,970

SMELTING COPPER-LEAD DROSSES AND THE LIKE

Arthur A. Collins, El Paso, Tex., assignor to American Smelting and Refining Company, New York, N. Y., a corporation of New Jersey No Drawing. Application August 28, 1943, Serial No. 500,423

9 Claims. (Cl. 75—24)

This invention relates to metallurgical processes and more particularly to smelting of drosses, mattes and the like, containing substantial quantities of copper and lead.

In the processes normally practiced in the recovery of lead and copper from ores containing these metals, there is produced a copper-lead dross. This dross as a general rule will contain magnetic oxide of iron which may vary in amounts. It has been common practice to remove this iron as a silicate slag by adding siliceous ores and scrap iron and smelting in a reverberatory at a temperature between 1300° C. and 1400° C. or higher. In such a process there is produced a copper speiss of relatively low copper to lead ratio, a slag high in lead and copper which must be treated in a lead blast furnace and a lead bullion from the reverberatory containing substantial quantities of copper, very frequently of the order of two and one half per cent.

It will be apparent that such practice entails a large circulating load of copper, making increased tonnage of copper-lead dross to be re-smelted although one of the important purposes in the smelting operations is the separation of the copper and lead so as to produce bullion as free from copper as possible and a copper speiss product as free from lead as possible.

According to another process for smelting copper-lead drosses and the like, the drosses are smelted in a reverberatory furnace in the presence of litharge, coke and sodium carbonate or some other salt of sodium, forming a lead bullion, copper speiss and soda matte, the latter having sometimes been referred to as a soda slag, although I prefer to call it a matte. This process has given satisfactory results and can fairly be said to be much preferable to the older processes wherein the drosses are smelted with siliceous ores and additional scrap iron.

In any case, it is not uncommon to encounter varying amounts of iron in the copper-lead drosses to be smelted. If the iron content tends to be high some difficulty may result in the operation of the furnace when the smelting is carried out with the sodium carbonate-litharge-coke flux due to the formation of accretions. Moreover, iron if in the form of magnetite does not collect so readily in the soda matte where it can be drawn off from the furnace. This undesirable condition may tend to be bothersome when the dross being treated has a relatively low sulphur content.

According to my invention, I take into account the content of iron in the dross to be treated whether it be in the form of magnetite, other oxide or some other compound and then adjust the content of the sulphur in the charge so that there will not be a deficiency of sulphur relative to the iron present and thereby I minimize or eliminate the formation of accretions as well as otherwise improving the results.

According to a preferred manner of carrying out the process of my invention, I employ a flux containing litharge, a carbonaceous reducing agent, a salt of sodium, such, for example, as sodium carbonate and sodium sulphate, which may be reduced to form a sodium sulphide matte and adjust the amount of sulphur in the charge so that there will be present at least an amount sufficient to form FeS with the iron present and at the same time to form a sodium sulphide matte in the smelting operation in which the iron compounds present may readily dissolve.

For example, if the copper-lead dross contains 2.6% Fe and 1.5% S, this is, according to my theory of the invention, a deficiency of sulphur. Accordingly, I add one-half to one and one-half percent of sulphur which may be raw sulphur, to the dross reverberatory charge along with the soda flux and thereby produce FeS and a soda matte in the form of NaS which will take up the iron in the dross including that originally present in the form of magnetite.

Although the novel features which are believed to be characteristic of this invention will be particularly pointed out in the claims appended hereto, the invention itself, as to its objects and advantages, and the manner in which it may be carried out, may be better understood by referring to the following description in which certain specific disclosures are made for the purpose of explanation.

In one manner of practicing the invention, molten blast furnace lead was drawn off into a large settler and after settling the molten lead was charged to a sixty-five ton receiving kettle. After a sufficient charge of lead had been received in the kettle a stirrer or mixing machine was used to stir the charge to which was added four percent soda ash based on the dross tonnage. The receiving kettle was continuously stirred to insure good mixing, then stopped. A fairly dry dross was formed with the soda ash well mixed throughout dross. About 25,000 pounds of dross was produced in the kettle with 1000 pounds of soda ash consumed.

The dross was removed from the surface of the lead in the kettle by a grab bucket attached to a crane. Grabs of 3000 pounds to 6000 pounds of dross were made, the lead drained out and while draining a mixture of one part raw or elemental sulphur, one part litharge, in the form of baghouse dust, and one part coke breeze was added to the top of the dross in the grab bucket in an amount to the extent of one to three percent of the dross weight. The dross contained about 65% lead, 20% copper, 5% arsenic, ½% antimony, 3% iron and 2% sulphur. It is significant to note that sufficient sulphur should be added to that already present in the dross to make certain the total amount after the addition is present in an amount equivalent to the iron present.

The dross together with the soda ash-litharge-coke flux and the added sulphur was then dropped into the reverberatory furnace where it was smelted while maintaining the furnace temperature in the neighborhood of 1250° to 1300° C. using 3,000,000 to 4,000,000 B. t. u. per ton of dross charged.

In the smelting, a top layer of sodium sulphide matte in which substantially all the iron collected, a middle layer of speiss and a bottom layer of bullion were formed. The furnace was tapped in customary fashion. The soda matte contained 32.5% copper and 5.1% lead, also, some arsenic and antimony; the speiss contained 62.65% copper, 6.9% lead, 5.9% arsenic and 0.9% antimony; and the bullion contained less than 1% copper. It will be observed that the soda matte produced had a copper to lead ratio of better than 6 to 1 and the speiss a copper to lead ratio of better than 9 to 1.

Generally speaking, copper-lead drosses may be encountered in commercial practice which will assay 13% to 30% Cu, 50% to 70% Pb and will contain varying amounts of As, Sb, S and Fe. In smelting this kind of dross in accordance with the principles of the invention the Fe and S content should be determined and then the sulphur content of the charge together with the soda flux should be adjusted so that there is not a deficiency of sulphur. There should be sufficient sulphur present when the charge is smelted to form a sodium sulphide matte and to maintain substantially all the Fe in the FeS form in solution in the soda matte. Accordingly, the iron may be collected in the matte and tapped off and there is less tendency for the iron to take the form of $Fe_3O_4$ of magnetite; the latter being conducive to the formation of accretions in the furnace.

Inasmuch as drosses may differ somewhat from time to time, varying amounts of soda ash may be necessary for best results and in this regard consideration should be given to the amount of iron present. The amount of soda ash to be used may vary from 3 to 7% and will depend upon the amount of iron in the dross or matte in case copper-leady mattes are smelted, and also the condition of the furance. Additional soda will often cure a badly acting furnace. The amount of litharge may vary from 1% to 3½% and the amount of coke or carbonaceous reducing material may vary from 1% to 3½%, one per cent usually being sufficient. Generally speaking, I prefer to have present in the charge sufficient PbO to react with any PbS present to reduce the PbS to Pb.

Ordinarily, the amount of sulphur to be added to the dross may range from ½% to 2%, bearing in mind the sulphur is added to make up any sulphur deficiency in the dross and a good rule is to estimate the amount of sulphur on the basis of the chemical equivalents of all iron in the dross to convert it to FeS. As a general rule I have found about ½% of the dross weight is a good percentage to add.

As a guide to the amount of sulphur to be added, let it be assumed, as an example, that there are ten tons of dross containing 3% Fe and 1% S. That constitutes 20,000 lbs. of dross, of which 600 lbs. is Fe and 200 lbs. is S. I roughly estimate 300 lbs. of S are required for 600 lbs. of Fe based upon their respective atomic weights. Hence, there is roughly a deficiency of 100 lbs. of S to be added. Of course, there is likelihood of loss of S as $SO_2$ in the reverberatory due to oxidation. Accordingly, in practice I usually add an excess over the 100 lbs. of sulphur to make up for such contingent loss and also to make certain there is present an excess over the equivalent weight of S necessary for reaction with the Fe present.

The operating temperature of the reverberatory furnace may vary depending upon the charge, the construction of the furnace and other variable factors. Ordinarily, I maintain the temperature in the furnace in the neighborhood of about 1300° C., although in many instances a lower temperature may be maintained. In my preferred practice I maintain the temperature of the speiss in the furnace in the neighborhood of 700° C. and the lead bullion in the furnace at about 600° C. Under these conditions I have produced speisses having on the average a copper to lead ratio of about 10 to 1 and in some instances have produced speisses having a copper to lead ratio of as high as 16 to 1.

From the foregoing it will be seen that the invention provides a method which may be utilized practically to eliminate difficulties caused from magnetite; it provides an easier smelting charge allowing the use of less fuel; and results in greater tonnage, cleaner lead and better copper-lead ratios.

The terms and expressions which have been employed in the foregoing are used as terms of description and not limitation and it will be understood that in the use of such terms and expressions and in practicing the invention, equivalents are comprehended and are to be included within the scope of the invention claimed.

What is claimed is:

1. In a process of smelting copper-lead dross and the like material containing a substantial quantity of iron in the presence of a sodium sulphide matte forming compound, litharge and a carbonaceous reducing agent, to produce a layer of lead bullion, a layer of copper speiss, and a layer of sodium sulphide matte, the step which comprises adding sulphur to the charge to react with the iron to form FeS.

2. A metallurgical process which comprises intermixing a sodium compound which forms a sodium sulphide matte, litharge and a carbonaceous reducing agent and elemental sulphur with a copper-lead dross containing a substantial quantity of iron whereby to form a smeltable charge, and smelting the charge in a reverberatory furnace at smelting temperature to form a layer of lead bullion, a layer of copper speiss and a layer of sodium sulphide matte, the amount of sulphur together with that originally present in the dross being sufficient to react with all iron present to form FeS.

3. A metallurgical process which comprises intermixing a compound which forms a sodium sulphide matte, litharge and a carbonaceous reducing agent and elemental sulphur with a copper-lead dross containing a substantial quantity of iron whereby to form a smeltable charge, and smelting the charge in a reverberatory furnace at a temperature not substantially above 1300° C. to produce a layer of bullion, a layer of copper speiss and a layer of sodium sulphide matte, the amount of sulphur together with that originally present in the dross being sufficient to react with all iron present to form FeS.

4. In a metallurgical process wherein a copper-lead dross containing iron is smelted in the presence of sodium carbonate, litharge and a carbonaceous reducing agent as a flux the step which comprises adjusting the sulphur content in the charge by the addition of sulphur in an amount to bring the total sulphur present to an amount sufficient to react with the total iron present to form FeS, thereby to inhibit the formation of accretions in the smelting furnace.

5. In a metallurgical process wherein a copper-lead dross containing iron is smelted in the presence of sodium carbonate up to 7%, litharge up to 3.5% and a carbonaceous reducing agent up to 3.5% as a flux the step which comprises adjusting the sulphur content in the charge by the addition of sulphur in an amount to bring the total sulphur present to an amount sufficient to react with the total iron present to form FeS.

6. In a process of smelting copper-lead dross and the like material wherein the material is smelted in a reverberatory in the presence of 1% to 3.5% litharge, 3% to 7% sodium carbonate, .75 to 3% coke, the step which comprises adding sulphur to the charge in an amount sufficient to convert the iron in the charge to FeS and to form a sodium sulphide matte in which the FeS is soluble.

7. A metallurgical process which comprises intermixing with a copper-lead dross containing iron, a quantity of sodium carbonate up to 5%, a quantity of litharge up to 3.5%, a quantity of coke up to 3.5% and a quantity of sulphur which together with any sulphur present in the dross will be sufficient to convert all iron present to FeS, whereby to form a smeltable charge, smelting the charge in a reverberatory furnace at smelting temperature whereby to produce a layer of matte in which substantially all iron in the dross will collect, a layer of copper speiss and a layer of lead bullion.

8. A metallurgical process which comprises intermixing with a copper-lead dross containing iron, 2% to 5% of sodium carbonate, 2% to 3.5% of litharge, .75% to 3.5% of coke and 0.5% to 2.5% of sulphur whereby to form a smeltable charge, smelting the charge in a reverberatory furnace at smelting temperature whereby to produce a layer of matte in which substantially all iron in the dross will collect, a layer of copper speiss having a copper to lead ratio of at least 5 to 1 and a layer of lead bullion.

9. A metallurgical process which comprises intermixing with a copper-lead dross containing iron, a quantity of sodium carbonate up to 5%, a quantity of litharge up to 3.5%, a quantity of coke up to 3.5% and a quantity of sulphur which together with any sulphur present in the dross will be sufficient to convert all iron present to FeS, whereby to form a smeltable charge, smelting the charge in a reverberatory furnace below 1300° C. whereby to produce a layer of matte in which substantially all iron in the dross will collect in the form of FeS, a layer of copper speiss and a layer of lead bullion.

ARTHUR A. COLLINS.